(12) United States Patent
Fujikawa

(10) Patent No.: US 6,522,832 B1
(45) Date of Patent: Feb. 18, 2003

(54) DIGITAL VERSATILE DISK DEVICE

(75) Inventor: Reiji Fujikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/343,230

(22) Filed: Jun. 30, 1999

(30) Foreign Application Priority Data

Jul. 3, 1998 (JP) .......................................... 10-189478

(51) Int. Cl.[7] .............................................. H04N 5/781
(52) U.S. Cl. ...................................... 386/125; 386/126
(58) Field of Search ................................. 386/1, 45–46, 386/125–126, 124; 369/53.2, 53.25, 53.37, 53.45, 9; 709/107; 714/724, 758

(56) References Cited

U.S. PATENT DOCUMENTS

| | | | | |
|---|---|---|---|---|
| 5,784,528 A | * | 7/1998 | Yamane et al. | 386/124 |
| 6,215,743 B1 | * | 4/2001 | Kamatani | 369/53.45 |
| 6,226,446 B1 | * | 5/2001 | Murase et al. | 386/126 |
| 6,240,469 B1 | * | 5/2001 | Ishibashi | 386/126 |
| 6,272,625 B1 | * | 8/2001 | DeCarno | 709/107 |

FOREIGN PATENT DOCUMENTS

| | | |
|---|---|---|
| JP | 8-167227 | * 12/1996 |
| JP | 9-73761 | 3/1997 |
| JP | 10-55230 | 2/1998 |

* cited by examiner

*Primary Examiner*—Thai Tran
*Assistant Examiner*—Christopher Onuaku
(74) *Attorney, Agent, or Firm*—Foley & Lardner

(57) ABSTRACT

A digital versatile disk device is provided which is capable of reproducing video disks without driving a computer even when the computer is not connected to the versatile disk device.

The digital versatile disk device is provided with a computer connection signal line 30 for detecting whether or not the computer is connected, a DVD drive 22 for reading information from a digital versatile disk, and a DVD controller for controlling the DVD drive in response to a result by the computer connection signal line 30. When the digital versatile disk device is not connected with the computer, the DVD controller 14 controls the DVD drive 22 in accordance with an operational instruction input from the control portion 16.

8 Claims, 2 Drawing Sheets

DIGITAL VERSATILE DISK DEVICE

BACKGROUND OF THE INVENTION

1. Field of the Invention

The present invention relates to a digital versatile disk device, and particularly relates to a digital versatile disk device which can be connected to a computer.

The present invention is based on Patent Application No. Hei 10-189478 filed in Japan, the contents of which are incorporated herein by reference.

2. Background Art

CDs (Compact Disks) have been developed for recording musical data, and have been used as supplemental large-volume recording media for computers because of a large memory capacity, and reduced cost in production. Recently, DVD (Digital Versatile Disk) devices, new recording media with a larger memory capacity, have been developed and begun to be put into practical use. As the technology of the multi-media advances and as the processing capacity of computers increases, the application fields of computers will expand in the near future, and the DVDs will take over the present position of CDs.

Nowadays, the application programs of computers are supplied by CDs, since a CD can be manufactured at lower cost. Therefore, in general, a majority of portable computers (note-type personal computers) use CDs because of their serviceability. In addition, in order to improve the portability and serviceability of portable computers, some computers has started to be provided with a mechanism which can remove or detach CD devices. In the future, the above mentioned computers will use DVDs instead of CDs as large volume supplemental memory devices.

However, in computers that are capable of removing CD or DVD devices, the removed CD or DVD device cannot be used alone as a unit. That is, a problem arises that it is possible to CD or DVD devices only when they are connected to a computer when installing an application and, when CD or DVD devices are not connected with a computer, they are not used for reproducing a video by being connected to a display.

Therefore, DVD devices are only serviceable when they are connected with a computer.

In such service conditions, even when CD or DVD devices are used only for reproducing a video, power must be supplied to the computer as a whole, that is, the computer body, a display, and peripheral devices connected to the computer body, so that the power consumption and the noise level becomes large. Furthermore, since the computer must be operated for only the reproduction of the video, the operation efficiency of the whole computer system becomes low.

The present invention is carried out in order to solve the above described problems, and it is an object of the present invention to provide a digital versatile disk device which is capable of reproducing a video even if the digital versatile disk device is not connected to a computer and thus without operating computers.

It is also an object of the present invention to provide a digital versatile disk device which can reduce power consumption and noise, and can improve the ease of operation.

SUMMARY OF THE INVENTION

In order to solve the above described problems, the first aspect of the present invention provides a digital versatile disk device comprising: a detection means for detecting whether or not the digital versatile disk device is connected to a computer; a DVD driving device for reading information from the digital versatile disk; a DVD decoder for reproducing sounds and images based on said information; and a control means for controlling said DVD driving device and said DVD decoder in response to the detection results by said detection means.

According to the second aspect of the present invention, the digital versatile disk device according to the first aspect further comprises a disconnection means for disconnecting an electrical connection between the digital versatile disk device and said computer in response to the result of said detection means.

According to the third aspect of the present invention, the digital versatile disk device according to the first aspect further comprises an inputting means for inputting an operational instruction from a user, wherein said control means controls said DVD driving device and said DVD decoder in response to the input instruction from said inputting means.

According to the fourth aspect of the present invention, in the digital versatile disk device according to the first aspect, wherein, when said detection means detects that the digital versatile disk device is not connected to a computer, the operation of said control means is stopped, and said DVD driving device is controlled by said computer.

According to the fifth aspect of the present invention, the digital versatile disk device according to the first aspect further comprises a DVD encoder for encoding external information input from the outside, wherein said DVD driving device can write information in the digital versatile disk; and said control means write signals output from said DVD encoder into said digital versatile disk.

DETAILED DESCRIPTION OF THE PREFERRED EMBODIMENTS

Hereinafter, a digital versatile disk device according to the first embodiment of the present invention will be described with reference to the attached drawings.

[The First Embodiment]

Figure 1:
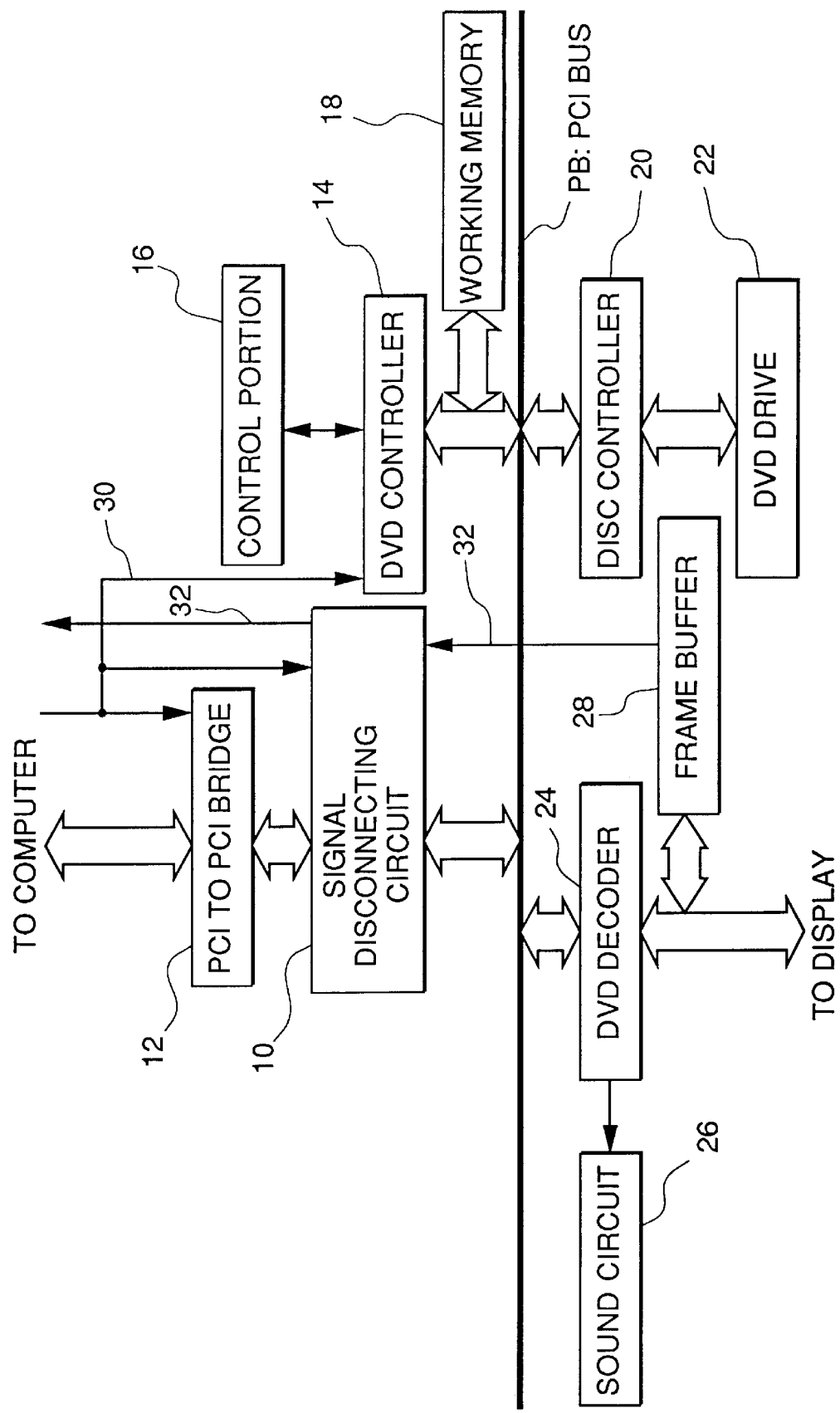
FIG. 1 is a block diagram showing a structure of the digital versatile disk device according to the first embodiment of the present invention.

FIG. 1 is a block diagram showing a structure of the digital versatile disk device according to the first embodiment of the present invention.

As shown in FIG. 1, the digital versatile disk device according to the first embodiment of the present invention comprises a signal disconnecting circuit 10, a DVD controller 14, a working memory 18, a disk controller 20, and a DVD decoder 24, all of which are connected to a PCI bus PB. Furthermore, a PCI to PCI bridge 12 is connected to the signal disconnecting circuit 10, a control portion 16 is connected to the DVD controller 14, a DVD drive 22 to the disk controller 20, and a sound circuit 26 to the DVD decoder 24. In addition, a frame buffer 28 is connected to the DVD decoder 24 and the signal disconnecting circuit 10, and a display (not shown in the figure) is connected to the DVD decoder 24.

The PCI to PCI bridge 12, connected to the PCI bus of the computer (not shown in the figure), executes arbitration or buffering of the PCI bus, outputs data from the digital versatile disk device to the computer, and also outputs data or instructions from the computer to the digital versatile disk device. A computer connection signal line 30 is connected to the signal disconnecting circuit 10, the PCI to PCI bridge 12, and the DVD controller 14. The voltage level of this computer connection signal line 30 is turned into, for example, "H (High)" level, when the digital versatile disk device is connected to the computer, and the voltage level of the computer connection signal line 30 is turned into "L (Low)" level when the digital versatile disk device is not connected to the computer. The computer connection signal line 30 becomes effective by being designed such that it is connected to the power source of the PCI bus when the digital versatile disk of the present invention is connected to the computer.

It should be understood that the computer connection signal line 30 is not limited to the above examples, and it may be possible to detect the connection with the computer by providing a micro-switch.

The signal disconnecting circuit 10 judges, based on the voltage level of the computer connection signal line 30, whether or not the digital versatile disk device is connected to the computer. When not connected, the signal disconnecting circuit 10 intercepts the electrical connection with the computer. Thus, in this case, the transfer of data between the computer and the digital versatile disk device is not executed. When it is detected that the digital versatile disk device is not connected with the computer, the PCI to PCI bridge 12 stops its operation based on the voltage level of the computer connection signal line 30.

The DVD controller 14 judges, based on the voltage level of the computer connection signal line 30, whether or not the digital versatile disk is connected to the computer and carries out an operation when the computer is not electrically connected. That is, the DVD controller receives an instruction from the control portion 16, controls the disk controller 20 and the DVD decoder 24 through the PCI bus PB, and reproduces the video.

The above control portion 16 is provided with an infrared light receiving component or the like, and when it receives an instruction from the outside (for example, an instruction from a remote-control device by a user), it outputs the content of the instruction to the DVD controller 14.

The working memory 18 is a memory used for the operations of the digital versatile disk device and temporarily stores data read from the DVD drive 22.

The disk controller 20 receives an order transmitted by the PCI bus PB, controls the DVD drive 22, and sends the data output from the DVD drive 22 to a forwarding address such as the DVD decoder 24.

The DVD drive 22 executes controlling of the DVD device and reading data from the DVD media, based on the order from the disk controller 20.

The DVD decoder 24 receives an reproduction order and data for reproduction transmitted through the PCI bus PB, decodes the voice and images, and writes the decoded voice and images into the frame buffer, as well as displays the decoded voice and images.

Hereinafter, the operation of the digital versatile disk device according to the first embodiment of the present invention will be described.

(1) Operations when the digital versatile disk device is not connected to the computer.

In this case, the voltage level of the computer connection signal line 30 is maintained at the "L" level.

Under this condition, when a power is applied to the digital versatile disk device, the PCI to PCI bridge 12 ceases to function because it can not obtain signals from the computer. The signal disconnecting circuit 10 recognizes that the digital versatile disk device is not connected to the computer from the voltage level of the computer connection signal line 30, disconnects signals between the computer side and the PCI bus PB, and disconnects an image data transfer signal line 32 for protecting the digital versatile disk device from influences by, for example, noise.

The DVD controller 14 recognizes that the computer is not connected from the voltage level of the computer connection signal line 30, and after initializing the working memory 18, executes initialization of the PCI bus PB, and recognition and initial setting of the DVD decoder 24 and the disk controller 20.

The DVD decoder 24 initializes and clears the frame buffer 28 simultaneously with the application of the power, and waits to be recognized by the DVD controller 14 through the PCI bus PB. When the recognition by the DVD controller is completed through the PCI bus PB, the DVD decoder is initialized by the instruction from the DVD controller 14.

The disk controller 20 initializes and resets the DVD drive 22 simultaneously with the application of the power, and waits to be recognized by the DVD controller 14 through the PCI bus PB. When the recognition by the DVD controller 14 is completed, the disk controller 20 is initialized.

The DVD controller 14 issues a command to confirm the status of the drive to the DVD drive 22 through the disk controller 20 in order to confirm whether or not the DVD drive is normal.

If the DVD drive is normal, the DVD controller 14 adjusts the disk controller 20 so as to be able to exhibit an optimum performance.

Next, a procedure for executing a DVD reproduction will be described.

The DVD controller 14 confirms the state of the DVD drive periodically by checking whether or not the medium is inserted. If the medium is not inserted, the DVD controller writes the information "there is no medium" into the frame buffer 28 through the DVD decoder. When such information is written in the frame buffer 28, the information will be indicated on the display.

When a medium is inserted, a confirmation is conducted about whether or not the inserted medium is reproducible. When a music CD is inserted, "music CD" is indicated, and after an image of a musical CD player is indicated on the display, the musical CD is reproduced as instructed by the control portion 16.

When a video CD is inserted, information "video CD is inserted" is indicated, and MPEG 1 data are read from the DVD drive 22 following an instruction from the control portion 16 through the disk controller 20, and the DVD controller 14 is instructed to send data to the DVD decoder 24.

When the DVD decoder 24 receives the instruction from the DVD controller 14 and also receives data for reproduction from the DVD drive 22, the DVD decoder 24 decompresses the compressed image information from the MPEG 1 and writes it in the frame buffer 28, and also carries out reproduction by transferring the sound information to the sound circuit 15.

Information of the frame buffer 28 is indicated on the display by loading on vertical and horizontal synchronizing signals.

When a DVD video is inserted, after indicating that the DVD video is inserted on the display, the DVD controller conducts the reproduction operation depending upon the instruction from the control portion 16. In this case, the DVD controller 14 first carries out a total survey of the media for investigating "what images are recorded in which area" and "what special reproduction is included". When the media is protected by copy protection, the media is made reproducible by exchanging the key between the DVD decoder 24 and the DVD drive 22.

Subsequently, the reproduction operation is started by an instruction from the controller 16.

The DVD controller 14 sends an instruction to start reproduction, and by setting the initial data for reproduction in the DVD decoder 24, the DVD decoder 24 decompresses the MPEG 2 and extracts sound data. The decompressed data are written in the frame buffer 28, and the sound information is transferred to the sound circuit 26 for reproduction.

Furthermore, the DVD decoder 24 requests that the DVD controller 28 or the DVD drive 22 read the next data, and the DVD drive 22 provides the next data to transfer to the DVD decoder 24.

The above operations provides for the reproduction of the DVD video.

When a request for a special reproduction is made by the control portion 16, the DVD controller 14 confirms about whether or not the area requested for the special reproduction is present in the effective area for the special reproduction. If the decision is effective, the special reproduction of the DVD video becomes possible by an instruction to conduct the special reproduction being sent to the DVD decoder 24.

In addition, when the control portion 16 sends various instructions such as the quick traverse, rewind, stop, or ejection, the DVD controller 14 transmits these instructions to the DVD decoder 24 and to the DVD drive 22 to execute these motions.

(2) Operations when the digital versatile disk device is connected to the computer.

When power is applied to the digital versatile disk device according to the first embodiment of the present invention under the condition that the digital versatile disk device is connected to the computer, the voltage level of the computer connection signal line 30 is in the "H" level. The PCI to PCI bridge 12, after being initialized, is in the wait state.

When the signal disconnecting circuit 10 judges that the digital versatile disk device is connected with the computer by the voltage level of the computer connection signal line 30, it connects signals between the PCI to PCI bridge 12 and the PCI bus PB, and also connects the image data transfer signal line 32 with the computer so as to be able to transfer data to each other.

When the DVD controller 14 confirms that the digital versatile disk device is not connected with the computer by the computer connection signal line 30, the DVD controller 14 is turned into the state wherein it is free from the controls of PCI bus PB.

Next, the computer conducts processing for initialization of the DVD decoder 24, the disk controller 20, and the DVD drive 22, which are connected to the PCI bus PB, through the PCI to PCI bridge 12.

After initialization, the DVD decoder 24 and the DVD drive 22 become controllable by the computer as peripheral devices of the computer.

When a reproduction of a DVD video of, for example, a DVD drive 22 is attempted, the data for reproduction is transferred from the DVD drive 22 to the DVD decoder 24 by an instruction from the computer, after exchanging the key between the DVD decoder 24 and the DVD drive 22 when necessary by an instruction from the computer.

The DVD decoder 24 decompresses the MPEG 2, writes the result into the frame buffer 28, and sends the sound data to the sound circuit 26.

When the external display is connected, information in the frame buffer 28 is indicated on the display by loading information on the vertical and horizontal synchronizing signals of the display. Furthermore, the content of the frame buffer 28 is transferred to the computer by use of the image data transfer signal line 32. Thereby, the DVD drive can be used even when connected with the computer and the reproduction can be executed. [The Second Embodiment]

Hereinafter, the second embodiment of the present invention will be described with reference to a attached drawing.

Figure 2:
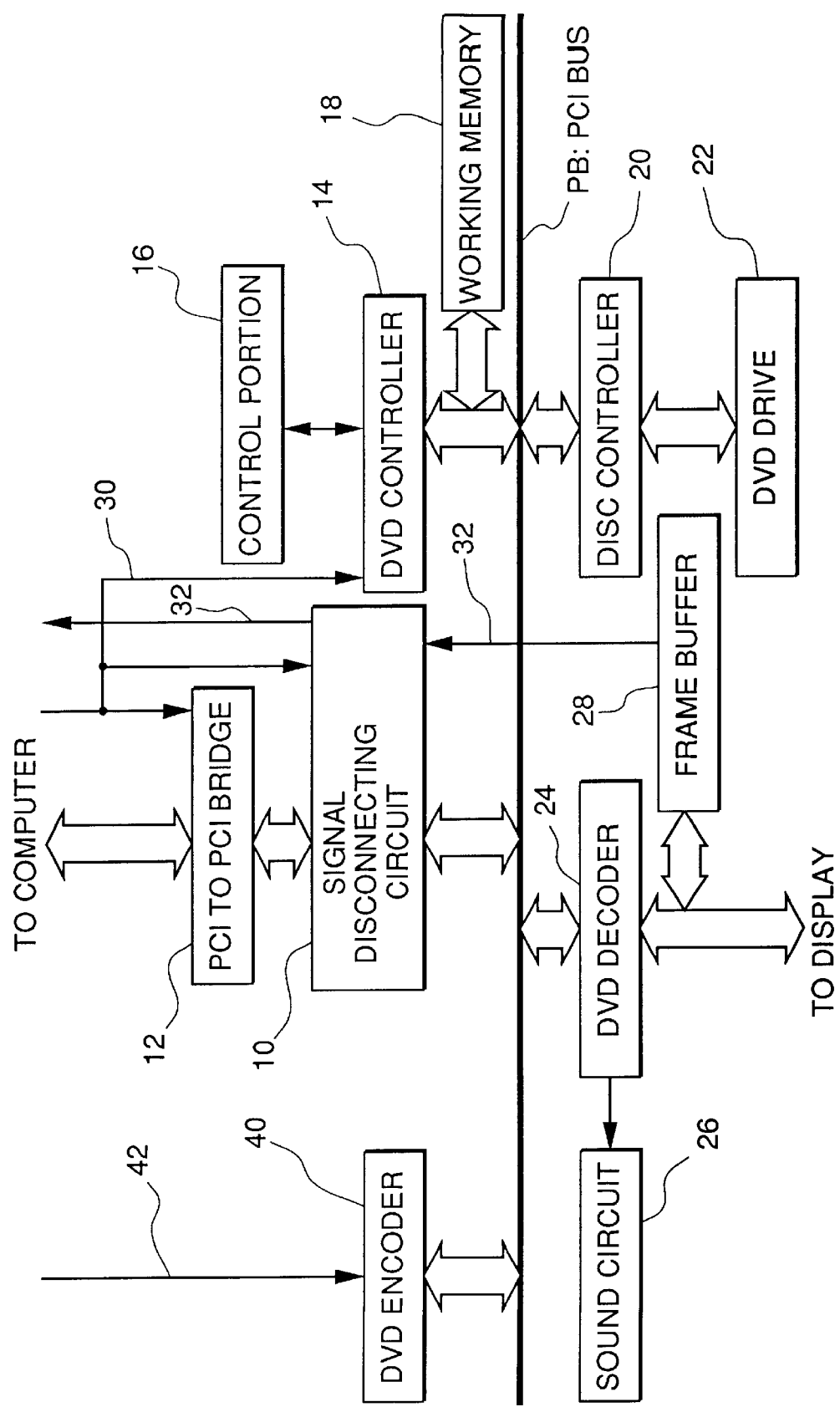
FIG. 2 is a block diagram showing a structure of the digital versatile disk device according to the second embodiment of the present invention.

The digital versatile disk device according to the second embodiment of the present invention shown in FIG. 2 differs from that according to the first embodiment of the present invention shown in FIG. 1 in that the second embodiment further comprises a DVD encoder 40 connected to the PCI bus PB.

It becomes possible to add a recording function to the second embodiment of the present invention by loading the above described DVD encoder 40, a medium which is re-recordable, and the drive.

Under the condition that the digital versatile disk device of the second embodiment is not connected to the computer, and when a reservation timer (not shown in the figure) or a signal that the video is recording is communicated to the DVD controller 14, the DVD controller 14 issues an instruction to the DVD encoder 40 such that the DVD encoder 40 starts compressing the video signals input through the video signal line 42 from the outside.

The DVD encoder 40 starts compression of the video signals input through the video signal line 42 by a given parameter and the data is sequentially transferred to the DVD controller 14 or the working memory 18.

When the DVD controller 14 receives the compressed sequential data from the DVD encoder 40, the DVD controller issues an instruction to the disk controller 20 so as to write data. The disk controller 20 calls the compressed sequential data and writes them into the DVD drive 22.

This processing is repeated until a completion order is issued or until an accident (for example, the volume of a medium is full) occurs.

When, in contrast, the digital versatile disk device of the second embodiment is connected to the computer, it becomes possible to capture the recorded image and the still images by setting the DVD encoder so as to be controlled from the computer.

Although the digital versatile disk device of the present invention is described in detail with reference to the embodiments, it should be understood that the present invention is not limited to the above embodiments, and any modifications can be added within the scope of the present invention.

For example, when the DVD controller 14 recognizes that the digital versatile disk device is connected to the computer, it may be possible to operate the present device from the computer by the use of generalized interface devices (parallel or serial). In this case, it becomes possible to control the DVD from the control portion 16, because the operational commands from the control device 16 are communicated to the DVD player software, since the DVD controller 14 is recognized as the generalized interface device by the DVD player software provided in the computer.

In addition, if synthesis of the DVD video images on the computer is not necessary, it is possible to omit the image data transfer signal line 32.

As described above, an effect of the present invention is that, since the digital versatile disk device of the present invention is provided with a control means for controlling the DVD driving device in response to the results of the detection means, it becomes possible for the present digital versatile disk device to carry out the video reproduction even when the DVD driving device is not connected to the computer.

Another effect of the present invention is that, when the detection means detects that the computer is not connected, the operation of the control means is stopped and the DVD driving device is controlled by the computer. Furthermore, when the computer is connected, the digital versatile disk device of the present invention is advantageously used as the peripheral device of the computer.

A further effect of the present invention is that provision of the digital versatile disk device of the present invention allows reduction of the power consumption of the whole system, including the present device and the computer and the reduction of noise incorporated in the video reproduction, because the computer can be disconnected depending upon conditions of the connection to the computer.

Furthermore, when the DVD driving device is used when the computer is not connected, it is not necessary to activate the computer, and low power consumption, reduction of noise, and improvement of the operability are realized.

What is claimed is:

1. A digital versatile disk (DVD) device comprising:
   a disc controller for controlling a DVD drive to read information from a digital versatile disk, the disc controller being coupled to a bus through which the disc controller receives driving instructions;
   a decoder for reproducing sounds and images based on said information read by the DVD drive;
   a bridge for coupling the bus to a computer so that the disc controller directly receives instructions from the computer;
   a detection means for detecting whether the DVD device is connected to a computer; and
   a device control means coupled to the bus that is operative to provide instructions to the disc controller and the decoder when the detection means detects that the DVD device is not connected to the computer, and that is not operative to provide instructions to the disc controller and the decoder when the detection means detects that the DVD device is connected to the computer.

2. A digital versatile disk device according to claim 1, wherein the digital versatile disk device further comprises a disconnection means for disconnecting an electrical connection between the digital versatile disk device and said computer when the detection means detects that the DVD device is not connected to the computer.

3. A digital versatile disk device according to claim 1, wherein the digital versatile disk device further comprises an inputting means for inputting an operational instruction from a user, wherein said device control means provides instructions to the disc controller and the decoder in response to input from said inputting means.

4. A digital versatile disk device according to claim 1, wherein the digital versatile disk device further comprises a DVD encoder for encoding external information input from the outside, and
   wherein encoded external information is written into the digital versatile disk in response to instructions received by the disc controller.

5. A digital versatile disk (DVD) device comprising:
   a disc controller for controlling a DVD drive to read information from a digital versatile disk, the disc controller being coupled to a bus through which the disc controller receives driving instructions;
   a decoder for reproducing sounds and images based on said information read by the DVD drive;
   a bridge for coupling the bus to a computer so that the disc controller directly receives instructions from the computer;
   a detector for detecting whether the DVD device is connected to a computer; and
   a device controller coupled to the bus that is operative to provide instructions to the disc controller and the decoder when the detector detects that the DVD device is not connected to the computer, and that is not operative to provide instructions to the disc controller and the decoder when the detector detects that the DVD device is connected to the computer.

6. A digital versatile disk device according to claim 5, wherein the digital versatile disk device further comprises a disconnection circuit for disconnecting an electrical connection between the digital versatile disk device and said computer when the detector detects that the DVD device is not connected to the computer.

7. A digital versatile disk device according to claim 5, wherein the digital versatile disk device further comprises an input for inputting an operational instruction from a user, wherein said device controller provides instructions to the disc controller and the decoder in response to operational instructions received through said input.

8. A digital versatile disk device according to claim 5, wherein the digital versatile disk device further comprises a DVD encoder for encoding external information input from the outside, and
   wherein encoded external information is written into the digital versatile disk in response to instructions received by the disc controller.

* * * * *